United States Patent [19]
Welborn

[11] Patent Number: 5,529,369
[45] Date of Patent: Jun. 25, 1996

[54] DOOR LATCHES FOR GOLF CARTS AND THE LIKE

[76] Inventor: Robert B. Welborn, 508 E. Barton St., Granbury, Tex. 76048

[21] Appl. No.: 452,309

[22] Filed: May 26, 1995

[51] Int. Cl.⁶ .................................................. B60J 5/04
[52] U.S. Cl. .................. 296/146.1; 49/394; 292/341.17; 292/210; 280/DIG. 5; 296/771
[58] Field of Search ............................. 296/146.1, 77.1, 296/79; 280/DIG. 5; 292/341.17, 340, 210, 228; 49/394

[56] References Cited

U.S. PATENT DOCUMENTS

| 477,694 | 9/1988 | Gerber. | |
|---|---|---|---|
| 728,087 | 5/1903 | Deardorff | 292/341.17 |
| 1,320,955 | 11/1919 | Wright | 292/228 |
| 2,460,399 | 2/1949 | Schassberger | 49/394 |
| 2,468,353 | 4/1949 | Weinke | 292/228 |
| 2,682,427 | 6/1954 | Bright. | |
| 2,801,868 | 8/1957 | Carson | 292/340 |
| 2,809,063 | 10/1957 | Taylor | 292/341.17 |
| 3,266,831 | 8/1966 | Banse | 292/341.17 |
| 3,709,553 | 1/1973 | Churchill et al.. | |
| 3,749,434 | 7/1973 | Gley | 292/228 |
| 4,336,964 | 6/1982 | Pivar. | |
| 4,621,859 | 11/1986 | Spicher | 296/77.1 |
| 4,690,440 | 9/1987 | Rogers | 292/228 |
| 5,393,118 | 2/1995 | Welborn | 296/77.1 |

FOREIGN PATENT DOCUMENTS 659498  10/1951  United Kingdom ............. 292/341.17

*Primary Examiner*—Gary C. Hoge
*Attorney, Agent, or Firm*—Roy L. VanWinkle

[57] ABSTRACT

The latch assembly includes a latch supported member mounted on a latch support post that is mounted on a golf cart or the like and disposed adjacent to a vertical door member, a latch member pivotally mounted on the latch support member, a latch bolt mounted on the door arranged to be releasably retained in a recess formed in the latch support member by the latch member, and a resilient member connected to the latch support member and to the latch member for biasing the latch member toward the position retaining the latch bolt and door.

8 Claims, 3 Drawing Sheets

DOOR LATCHES FOR GOLF CARTS AND THE LIKE

TECHNICAL FIELD OF THE INVENTION

This invention relates generally to improvements for golf carts and the like. More particularly, but not by way of limitation, it relates to an improved door latch that is useful on golf carts and the like.

BACKGROUND OF THE DISCLOSURE

With the increasing popularity of golf, the use of golf carts has become very prevalent. The use of the carts allows more people to play because such use enables those to play who are physically unable to walk the required distance and because their use reduces the time required to play a course enabling more people to use the course during a given time period.

Winter and relatively bad weather no longer deter golfers from enjoying the game. To provide more comfort, the normally open-air carts are frequently provided with enclosures that generally include roofs, windshields, rear curtains, and door closures of one type or the other. Most often, the door closures are simply curtains that zip or snap closed.

Various types of enclosures for golf carts and the like are shown in U.S. Pat. No. 2,460,399 dated February 1949 and issued to Schassberger; U.S. Pat. No. 2,682,427 dated June 1954 and issued to Bright; U.S. Pat. No. 3,709,553 dated January 1973 and issued to Churchhill et al.; U.S. Pat. No. 4,336,964 dated June 1982 and issued to Pivar; U.S. Pat. No. 4,621,859 dated November 1986 and issued to Spicher; and U.S. Pat. No. 4,773,694 dated September 1988 and issued to Gerber. Swinging doors are shown only in U.S. Pat. Nos. 4,621,859 and 2,682,427 and door latches are shown therein. However, the latches are not similar to the latches of this invention.

U.S. Pat. No. 5,393,118 issued to Robert B Welborn on Feb. 28, 1995 illustrates doors for golf carts that are hinged at the front of the cart and swing on hinges to permit access to the interior of the cart. Although the doors are constructed from relatively rigid tubing, they do flex and are manufactured in basically one size to fit a variety of different carts and thus do not fit precisely. Also, roofs and roof supports frequently vary in size and in position on the cart. Accordingly, the provision of a suitable latch for the doors has presented a number of problems.

The lack of precision and the flexibility of the doors themselves cause problems in attempting to install a latch mechanism. The latches must be easy to operate from both inside and outside the cart. They must be simple and inexpensive and yet, require little, if any, maintenance.

An object of this invention is to provide an improved door latch for use on golf carts and the like that is inexpensive, simple, easy and convenient to operate from inside and outside the cart, and one that provides accommodation for the lack of precision fit of the doors.

SUMMARY OF THE INVENTION

This invention then provides an improved door latch for use on golf carts and the like. The improved latch comprises a relatively rigid door frame hingedly mounted on a cart and having a generally vertically disposed rear frame member; an elongated latch bolt adjustably positioned on the door frame and projecting therefrom toward the rear end of the cart; a latch post mounted on the cart and extending generally parallel to the rear frame member; a latch support member mounted on the latch post and having a latch bolt receiving recess therein; and a latch member pivotally mounted on the support member adjacent to the planer surface. The latch member having a notch therein for entrapping the latch bolt and being movable from a first position wherein the recess and notch are aligned to receive the latch bolt to a second position wherein the latch member engages the latch bolt to retain the latch bolt between the latch member and the latch support member. The latch member has a cam surface thereon engagable with the latch bolt to pivot the latch member from the second position to the first position. The latch also includes a resilient member having one end connected to the latch member and a second end connected to the latch support member for biasing said latch member toward the second position.

BRIEF DESCRIPTION OF THE DRAWING

The foregoing and additional objects and advantage of the invention will become more apparent when the following detailed description is read in conjunction with the accompanying drawing wherein like reference characters denote like parts in all views and wherein.

DETAILED DESCRIPTION OF THE PREFERRED EMBODIMENT

Figure 1:
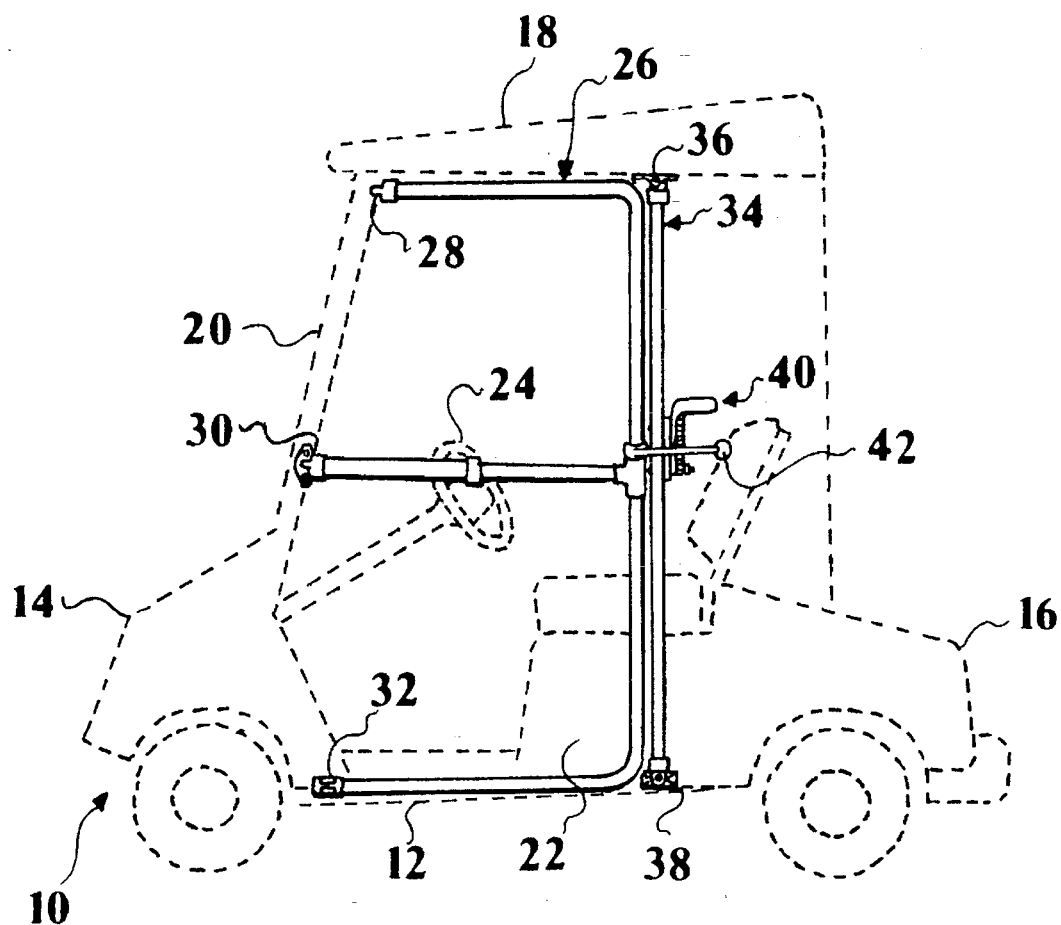
FIG. 1 is a side view illustrating a golf cart, in dash lines, having a side door thereon and a latch that is constructed in accordance with the invention installed thereon, show in solid lines.

Referring to the drawing and to FIG. 1 in particular, shown therein in dash lines and generally designated by the reference character 10 is a golf cart. The golf cart includes a body 12 having a front end 14, a rear end 16, an attached roof 18, and a windshield 20. Within the cart 10, a seat 22 is provided for the occupants of the cart. A steering wheel 24 projects toward the seat 22. It will be understood that the cart 10 is provided a motor, other controls, etc. as required to control the cart.

Doors, each of which includes a frame 26, are constructed from relatively rigid tubing and are pivotally connected to the cart 10 by hinges 28, 30, and 32. Springs (not shown) are provided to urge the doors toward the closed position at all times. While the cart 10 will include two doors, they are mirror images and only one door will be described in detail hereinafter.

A latch post 34 extends generally vertically just to the rear of and in juxtaposition with the rear of the door frame 26. An upper end 36 of the latch post 34 is connected to the roof 18 of the cart 10 and a lower end 38 is connected to the cart 10 near the bottom of the seat 22.

A releasable latch assembly 40 is mounted partially on the post 34 and partially on the door frame 26. The latch assembly functions to retain the door frame 26 in the closed position when desired. The latch assembly 40 will be described in more detail hereinafter.

Figure 2:
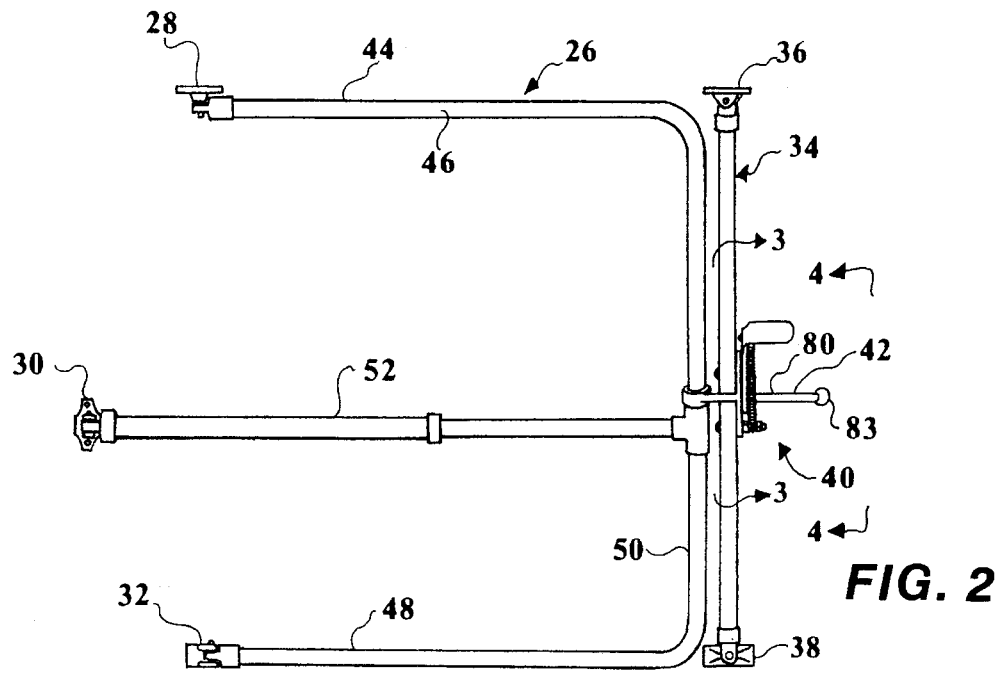
FIG. 2 is an enlarged view of the door frame shown in FIG. 1, removed from the cart.
Figures 3, 4:
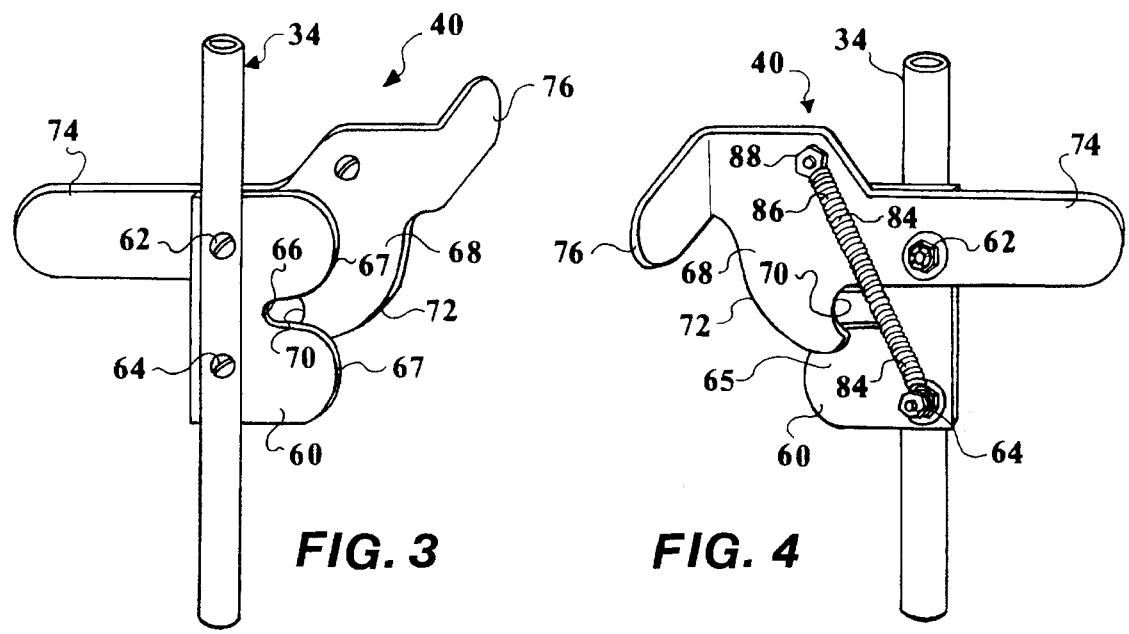
FIG. 3 is an enlarged view taken generally along the line 3—3 of FIG. 2 showing the door latch in more detail with the latch bolt removed such as when the door is open.
FIG. 4 is an enlarged view taken generally along the line 4—4 of FIG. 2 showing the door latch assembly in more detail also with the latch bolt removed such as when the door is open.

The door assembly 26, as shown in FIGS. 1 and 2, includes a generally U-shaped tubular member 44 having an upper portion 46 disposed horizontally adjacent to the roof 18 and a lower portion 48 disposed horizontally adjacent to the lower portion of the cart 10. The upper and lower portions are connected by a vertically disposed portion 50 that extends parallel to the post 34. Free ends of the portions 46 and 48 are connected, respectively, by hinges 28 and 32 to the cart 10. A central member 52 of the assembly 26 has one end releasably connected to the portion 50 and the other end connected by the hinge 30 to the cart 10.

FIGS. 2–7 illustrate the structure and operation of the latch assembly 40 in greater detail. In addition to the latch bolt 42, the latch assembly 40 includes a latch support member 60 that is mounted on the latch post 34 by spaced fastening members or screws 62 and 64. The latch support member 60 is provided with a planer surface 65 that has a generally vertical orientation and a latch bolt receiving recess 66 in an edge thereof facing outwardly relative to the interior of the cart 10. The recess 66 is defined by a pair of curved cam surfaces 67 to guide the latch bolt 42 into the recess 66.

The latch assembly 40 also includes a latch member 68 disposed adjacent to the surface 65 on the latch support member 60. The latch member 68 is pivotally connected to the latch support member 60 and to the latch post 34 by the screw 62 which also functions as a pivot pin for the latch member 68. The latch member 68 has a notch 70 in a lower edge thereof arranged to cooperate with the recess 66 in the latch support member 60 to trap the latch bolt 42 as will be described thereby retaining the door in the closed position. The latch member 60 is also provided with a cam surface 72 on the edge thereof adjacent to the notch 70 to enable the latch bolt 42 to pivot the latch member 68 relatively upwardly upon engagement therewith during closing of the door so that the latch bolt 42 can enter the recess 66.

The latch member 68 also includes an inwardly projecting portion 74 that is arranged to be engaged by the elbow of the occupant of the golf cart 10 so that the latch member 68 can be pivoted to release the latch bolt 42. In addition, the latch member 68 includes an outwardly projecting portion 76 that is arranged to be grasped by a person outside the cart 10 for pivoting the latch member 68 to a position releasing the latch bolt 42 from the outside of the cart 10.

The latch member 68 and the latch support member 60 are preferably constructed from a relatively rigid thermoplastic such as polypropylene. This type of plastic can be easily formed into the desired configuration, virtually eliminates the need for maintenance and smoothing the cam surfaces promotes easy camming action with the metal latch bolt 42 without requiring lubricants. The latch is also relatively quiet in operation because the only contact in the latch is metal to plastic. There is no metal to metal contact.

Figure 5:
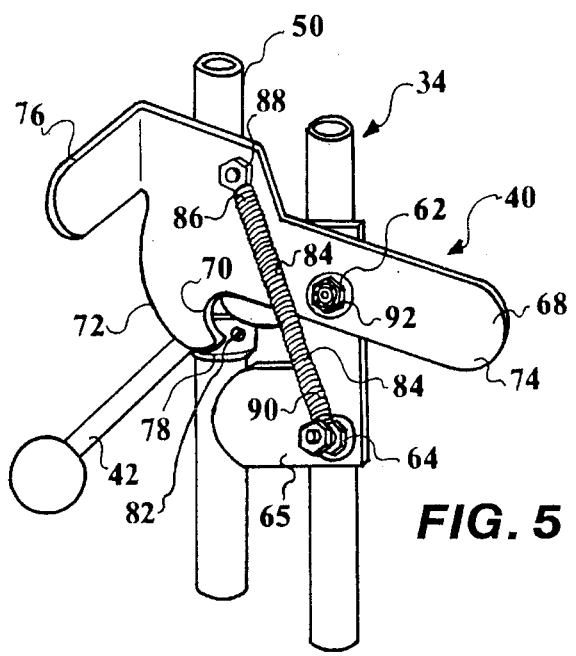
FIG. 5 is is a view similar to FIG. 4, but showing the latch member partially moved by the latch bolt toward the open position of the latch assembly.
Figure 6:
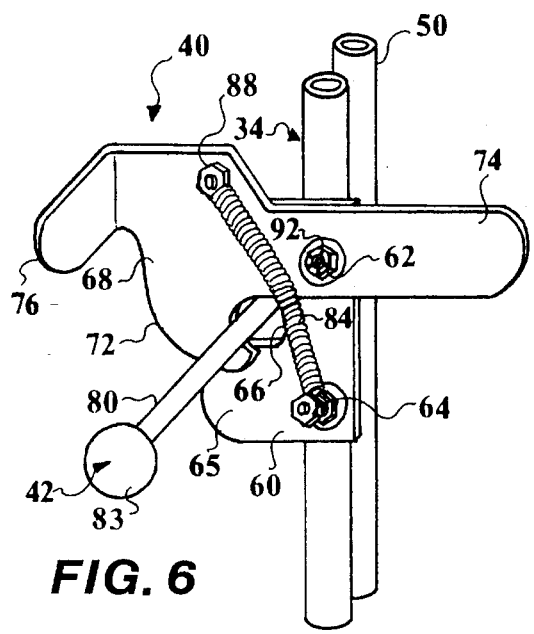
FIG. 6 is a view similar to FIG. 5, but showing the latch assembly in the closed position trapping the latch bolt to retain the door closed.
Figure 7:
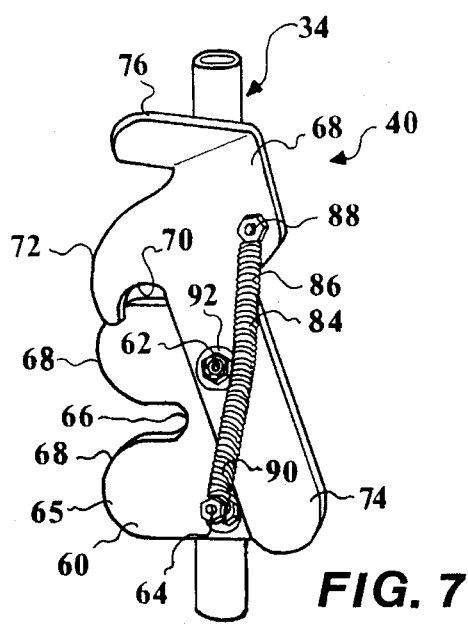
FIG. 7 is a view similar to FIG. 4, but showing the latch assembly in a non-latching position.

The latch bolt 42 is secured to the vertical frame portion 50 by a collar 78 that is welded or otherwise suitably attached to a latch bolt rod 80. The collar 78 is fixed in place on the portion 50 by a set screw 82 (See FIG. 5). The use of the collar 78 and set screw 82 permits selective positioning of the latch bolt to accommodate variations in the position of the door relative to the latch post 34. The latch bolt 42 can be adjusted in both the vertical and horizontal positions allowing for wide variations in the door frames while providing latches that are fully operational. As shown in FIGS. 2 and 6, the free end of the rod 80 is provided with a ball 83 which makes it a little easier for the operator to open the door from outside the cart.

For the most part it is desirable to keep the latch assembly 40 in the operational mode, that is, in a condition wherein the latch member will entrap the latch bolt 42. To accomplish this, the latch assembly 40 includes a resilient member 84 that has an end 86 attached to the latch member 68 by a fastener 88 and another end 90 attached to the fastener 64. the arrangement is such that a biasing force is exerted on the latch member 68 urging its pivotal movement about the pivot pin 62 in a direction to trap the latch bolt 42. The resilient member 84 is clearly shown in FIGS. 5, 6, and 7 and in those figures takes the form of an extension spring.

Sometimes it is desirable, particularly when there is little or no wind, to place the latch in an inoperable position wherein it will not trap the latch bolt 42 and the latch assembly does not have to be operated to open the door. This configuration is clearly illustrated in FIG. 7. As shown therein, the nut 92, located on the pivot pin 62 protrudes from the latch member 68 providing an abutment that will engage and hold the spring 84 in a position biasing the latch member 68 to a position wherein the latch member 68 cannot trap the latch bolt 42. Accordingly, the door can be opened without operating the latch assembly 40.

It is very easy to rotate the latch member 68 to the open position and slip the spring 84 over the nut 92. With this simple action, the latch member is placed in the inoperative mode.

OPERATION OF THE PREFERRED EMBODIMENT

It is believed that the operation of the invention will be self-evident from the foregoing description, however, the following brief description of the operation may be helpful.

Assuming that the cart 10 is occupied with the latch assembly 40 in the operative position with the spring 84 out of engagement with the nut 92 and the door is closed, the latch member 68 is urged by the spring 84 toward a position trapping the latch bolt 42 as shown in FIG. 6.

When the door is to be opened, the operator engages the portion 76 of the latch member 68 with his elbow pivoting the latch member 68 into the first or open position moving the member 68 away from the recess 66 unlatching the door. When unlatched, the door can be pushed open to permit the operator to exit the cart 10.

After exiting the cart 10, the operator releases the door and the spring (not shown) extending between the door and the cart applies a force swinging the door toward the cart. As the door closes, the latch bolt 42 strikes the surface 72 on the latch member 68 pivoting the latch member 68 upwardly into the first position, moving the latch member 68 away from the recess 60 in the latch support member 60 as shown in FIG. 5. Whereupon the latch bolt enters the recess 66 and moves off the surface 72 permitting the latch member 68 to pivot downwardly to the second position under the influence of the spring 84 to trap the latch bolt 42 between the latch member 68 and the latch support member 60. If there is some misalignment between the latch bolt 42 and the recess 66 during closure of the door, the latch bolt strikes one of the cam surfaces 67 on the latch support member 60 moving the latch bolt 42 into the recess 66.

To enter the cart 10 from the exterior, the procedure is essentially the same, except that the operator grasps the outwardly projecting portion 76 of the latch member 68, pivots the latch member 68 to the first or open position, and pulls outwardly on the latch rod 80 or ball 83 on the end of the latch rod to swing the door open. As before described, releasing the door causes the latch assembly 42 to operate to trap the latch bolt 42 and secure the door in the closed position.

It will be appreciated that the door latch 40 will operate and can be installed on many makes and models of golf carts. Also, tolerances need not be very closely maintained due to the generous size of the camming surfaces 67 and 72 on the latch support member 60 and on the latch member 68 and due to the adjustability of the position of the latch bolt 42.

DESCRIPTION OF THE MODIFICATION OF FIG. 8

Figure 8:
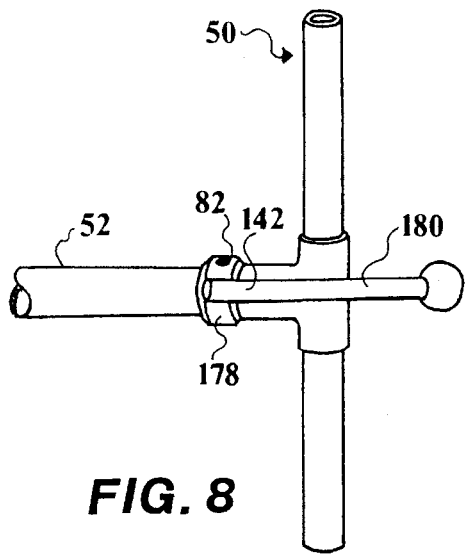
FIG. 8 is a view of a modification of the latch bolt that is also constructed in accordance with the invention.

Another way of installing the latch bolt is illustrated in FIG. 8. As shown therein, a latch bolt 142 includes a latch bolt rod 180 that is welded or otherwise suitably attached to a collar 178 with the rod 180 extending parallel to the hole through the collar 178. This arrangement is rotated 90 degrees from the assembly of the rod 80 and collar 78 previously described. In the modified form of the latch bolt 142, the collar 178 is mounted on the horizontally extending frame member 52 instead of on the vertical portion 50 and held in place by a set screw 182. The modified bolt 142 is also adjustable in both the vertical and horizontal direction, but to a slightly less degree than the bolt 42.

The big advantage to the use of the latch bolt 142 is that it can be used in retrofit the latch assembly 40 onto carts where it may not be possible to use the latch bolt 42. The U-shaped frame 26 of the door is bent at two places and the collar 42 will not slip over the bends. However, the bolt 142 can be installed over the straight central member 52 when it is disassembled. Thus, the latch assembly with the modified latch bolt 142 can be utilized to great advantage to retrofit carts that have doors, but do not have latches.

As is to be expected, there is no difference in the use and operation of the latch assembly 40 regardless of which latch bolt arrangement is utilized.

It will be appreciated from the foregoing detailed description that a latch constructed in accordance with the invention provides a simple, easily used, effective means for securing the doors of golf carts that requires little or no maintenance and that is relatively inexpensive.

What I claim is:

1. A releasable latch assembly for use with hinged doors mounted on golf carts having a front end and a rear end, said assembly comprising in combination:

a relatively rigid door frame hingedly mounted on said cart and having a generally vertically disposed rear frame member;

an elongated latch bolt adjustably positioned on said door frame and projecting therefrom toward the rear end of the cart;

a latch post mounted on the cart and extending generally parallel to said rear frame member;

a latch support member mounted on said latch post and having a generally vertically disposed planar surface and having a latch bolt receiving recess therein;

a latch member pivotally mounted on said support member adjacent to said planar surface, said latch member having a notch therein for entrapping said latch bolt, said latch member being movable from a first position wherein said recess is open to receive said latch bolt to a second position wherein said latch member engages said latch bolt to retain said latch bolt between said latch member and said latch support member, said latch member having a cam surface thereon engagable with said latch bolt to pivot said latch member from said second position to said first position;

resilient means having one end connected to said latch member and a second end connected to said latch support member for biasing said latch member toward said second position; and a pivot member pivotally connecting said latch and latch support members, said pivot member including a portion selectively engagable with said resilient means for biasing said latch member toward said first position wherein said latch bolt resides in said notch and recess in unrestrained condition.

2. The latch assembly of claim 1 wherein said pivot member extends through said latch support member connecting said latch and latch support members to said latch post.

3. The latch assembly of claim 2 and also including a fastening member connecting said latch support member and said resilient means to said latch post.

4. The latch assembly of claim 3 wherein said resilient means includes an elongated extension spring.

5. A releasable latch assembly for use with hinged doors mounted on golf carts having a front end and a rear end, said assembly comprising in combination:

a relatively rigid door frame hingedly mounted on said cart and having a generally vertically disposed rear frame member;

an elongated latch bolt adjustably positioned on said door frame and projecting therefrom toward the rear end of the cart, said latch bolt includes a collar encircling said rear frame member immovably connecting said latch bolt to said rear frame member;

a latch post mounted on the cart and extending generally parallel to said rear frame member;

a latch support member mounted on said latch post and having a generally vertically disposed planar surface and having a latch bolt receiving recess therein;

a latch member pivotally mounted on said support member adjacent to said planar surface, said latch member having a notch therein for entrapping said latch bolt, said latch member being movable from a first position wherein said recess is open to receive said latch bolt to a second position wherein said latch member engages said latch bolt to retain said latch bolt between said latch member and said latch support member, said latch member having a cam surface thereon engagable with said latch bolt to pivot said latch member from said second position to said first position; and, resilient means having one end connected to said latch member and a second end connected to said latch support member for biasing said latch member toward said second position.

6. The latch assembly of claim 5 wherein at least one set screw releasably locks said collar to said rear frame member whereby said collar and latch bolt are adjustable in the vertical direction and in the horizontal direction.

7. A releasable latch assembly for use with hinged doors mounted on golf carts having a front end and a rear end, said assembly comprising in combination:

a relatively rigid door frame hingedly mounted on said cart, said door frame having a generally vertically disposed rear frame member and a horizontally extending frame member attached at one end to said rear frame member;

an elongated latch bolt adjustably positioned on said door frame and projecting therefrom toward the rear end of the cart, said latch bolt including a collar encircling said horizontally extending frame member immovably connecting said latch bolt to said horizontally extending frame member;

a latch post mounted on the cart and extending generally parallel to said rear frame member;

a latch support member mounted on said latch post and having a generally vertically disposed planar surface and having a latch bolt receiving recess therein;

a latch member pivotally mounted on said support member adjacent to said planar surface, said latch member having a notch therein for entrapping said latch bolt, said latch member being movable from a first position wherein said recess is open to receive said latch bolt to a second position wherein said latch member engages said latch bolt to retain said latch bolt between said latch member and said latch support member, said latch member having a cam surface thereon engagable with said latch bolt to pivot said latch member from said second position to said first position; and, resilient means having one end connected to said latch member and a second end connected to said latch support member for biasing said latch member toward said second position.

8. The latch assembly of claim 7 wherein at least one set screw releasably locks said collar to said horizontally extending frame member whereby said collar and latch bolt are adjustable in the vertical direction and in the horizontal direction.

* * * * *